(12) United States Patent
Weber

(10) Patent No.: US 10,371,175 B2
(45) Date of Patent: Aug. 6, 2019

(54) HYDROPNEUMATIC PRESSURE ACCUMULATOR

(71) Applicant: HYDAC TECHNOLOGY GMBH, Sulzbach/Saar (DE)

(72) Inventor: Norbert Weber, Saarbruecken (DE)

(73) Assignee: HYDAC TECHNOLOGY GMBH, Sulzbach/Saar (DE)

(*) Notice: Subject to any disclaimer, the term of this patent is extended or adjusted under 35 U.S.C. 154(b) by 0 days.

(21) Appl. No.: 15/314,973

(22) PCT Filed: Jun. 5, 2015

(86) PCT No.: PCT/EP2015/001143
§ 371 (c)(1),
(2) Date: Nov. 30, 2016

(87) PCT Pub. No.: WO2016/005019
PCT Pub. Date: Jan. 14, 2016

(65) Prior Publication Data
US 2017/0198725 A1   Jul. 13, 2017

(30) Foreign Application Priority Data

Jul. 5, 2014  (DE) ........................ 10 2014 010 006

(51) Int. Cl.
*F15B 1/24* (2006.01)
*F15B 1/08* (2006.01)
(Continued)

(52) U.S. Cl.
CPC ................. *F15B 1/24* (2013.01); *F15B 1/08* (2013.01); *F15B 1/10* (2013.01); *F16L 55/053* (2013.01);
(Continued)

(58) Field of Classification Search
CPC ...... F15B 1/24; F15B 1/08; F15B 1/10; F15B 2201/31; F15B 2201/3151;
(Continued)

(56) References Cited

U.S. PATENT DOCUMENTS 2,688,984 A   9/1954  Snyder
4,606,376 A   8/1986  Bernard et al.
(Continued)

FOREIGN PATENT DOCUMENTS

DE   17 51 900   7/1971
DE   2 008 740   9/1971
(Continued)

OTHER PUBLICATIONS

International Search Report (ISR) dated Aug. 18, 2015 in International (PCT) Application No. PCT/EP2015/001143.

*Primary Examiner* — Craig M Schneider
*Assistant Examiner* — David Deal
(74) *Attorney, Agent, or Firm* — Wenderoth, Lind & Ponack, L.L.P.

(57) ABSTRACT

A hydropneumatic pressure accumulator, in particular a pulsation damper, includes an accumulator housing (2) and a movable separating element (20), which separates a pressurized working gas-containing gas working space (24) from a fluid chamber (22) in the accumulator housing (2). A gas storage chamber (12) is provided, which contains an additional volume of the pressurized working gas, and is connected via a connecting path (30) having a throttle point to the gas working space.

6 Claims, 3 Drawing Sheets

(51) Int. Cl.
*F15B 1/10* (2006.01)
*F16L 55/053* (2006.01)
(52) U.S. Cl.
CPC ..... *F15B 2201/205* (2013.01); *F15B 2201/31* (2013.01); *F15B 2201/3151* (2013.01); *F15B 2201/32* (2013.01); *F15B 2201/4155* (2013.01)
(58) Field of Classification Search
CPC ............ F15B 2201/205; F15B 2201/32; F15B 2201/4155; F16L 55/053
USPC .............................................. 138/31, 30, 26
See application file for complete search history.

(56) References Cited

U.S. PATENT DOCUMENTS 8,387,665 B2 * 3/2013 Lundberg ................. F15B 1/24
138/30

| | | | | |
|---|---|---|---|---|
| 2003/0075225 | A1* | 4/2003 | Dinkel | .................... F15B 1/103 138/31 |
| 2006/0204389 | A1* | 9/2006 | Weber | ....................... F15B 1/24 417/540 |
| 2008/0216640 | A1* | 9/2008 | Brand | ....................... F41A 9/44 89/47 |
| 2010/0326063 | A1* | 12/2010 | LeBlanc | ................... F15B 1/24 60/327 |
| 2012/0168265 | A1* | 7/2012 | Mahnkopf | ................ B60T 1/10 188/106 P |
| 2015/0322972 | A1* | 11/2015 | Baugh | ....................... F15B 3/00 60/327 |

FOREIGN PATENT DOCUMENTS

| | | |
|---|---|---|
| DE | 198 14 835 | 10/1999 |
| DE | 10 2009 049 547 | 2/2011 |
| EP | 0 202 502 | 11/1986 |

* cited by examiner

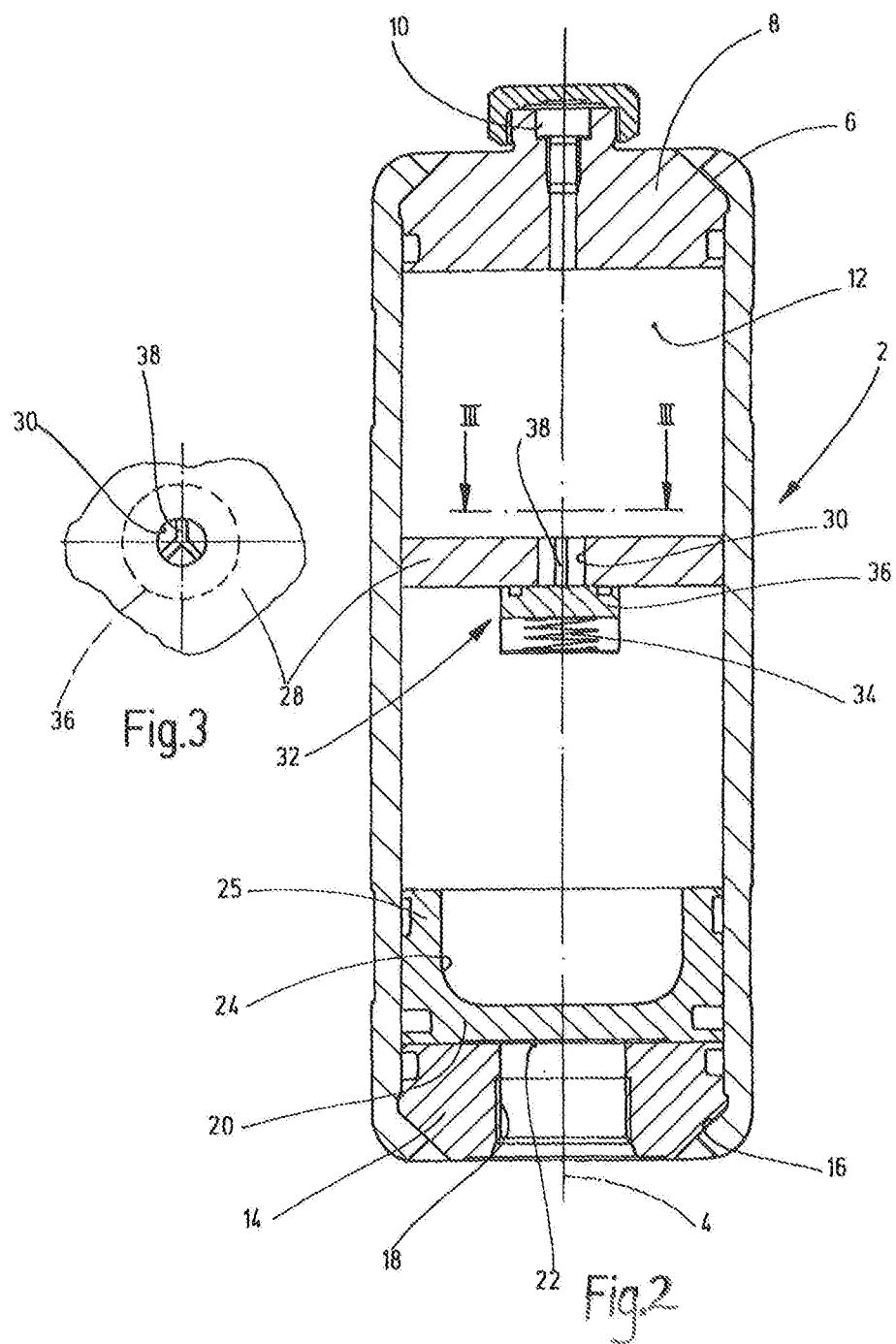

HYDROPNEUMATIC PRESSURE ACCUMULATOR

FIELD OF THE INVENTION

The invention relates to a hydropneumatic pressure accumulator, in particular, a pulsation damper, having an accumulator housing and a movable separating element separating a gas working chamber containing pressurized working gas from a fluid chamber in the accumulator housing.

BACKGROUND OF THE INVENTION

Hydropneumatic pressure accumulators of this type are prior art (DE 10 2009 049 547 A1) and are frequently used as pulsation dampers in hydraulic circuits. Such pressure accumulators are desirable or functionally relevant to smooth pressure fluctuations in the system, as is the case, for example, in hydraulic steering systems or brake systems of mobile work equipment, wheel loaders or the like. To achieve an optimum profile of the pressure/volume characteristic for an efficient damping, the gas working chamber in such pressure accumulators must be designed to have a comparatively small volume. As a result, however, the proper function is limited in time, because the normal and known loss of gas, which necessarily occurs via seals in piston accumulators or due to the permeability in bladder accumulators or diaphragm accumulators, results in an unreasonably high pressure loss in small volumes of gas. If, in order to counter this, the volume of the gas working chamber is enlarged in such a way that the gas losses occurring do not result in a substantive loss of pressure and thereby prolong the operating life, the efficiency of the damping deteriorates, in particular for higher frequency damping pulses, because the system becomes too "soft" at higher working space volumes.

SUMMARY OF THE INVENTION

In view of this problem, an object of the invention is to provide an improved hydropneumatic pressure accumulator, in particular in the form of a pulsation damper, which guarantees a long operating life at simultaneous high damping efficiency, without having to accept the disadvantages of a large-volume gas working chamber.

This object is basically achieved according to the invention by a hydropneumatic pressure accumulator where a gas storage chamber containing a make-up volume of the pressurized working gas is provided and is connected to the gas working chamber via a connecting path that includes a restriction. In this way, gas from the make-up volume may flow to the working space when losses occur during operation. This arrangement provides the advantageous opportunity of designing the gas working chamber having a low volume without adversely affecting the long-term function, because a gas equalizing volume is available from the gas storage chamber, which may be correspondingly designed having a large volume. The restriction in the connecting path may be designed in such a way that, upon rapid changes in pressure, a strong pressure increase occurs in the gas working chamber at minimum volume displacement, dynamically decoupling the working space from the storage chamber, while the static behavior corresponds to that of a large-volume system.

According to a second aspect of the invention, the problem addressed by the invention is also solved by a hydropneumatic pressure accumulator where the connecting path between the gas storage chamber and the gas working chamber includes a check valve. The check valve opens when the pressure in the gas storage chamber exceeds the pressure in the gas working chamber. This structure prevents any transfer of gas from the gas working chamber into the gas storage chamber due to a the pressure increase generated by pulsations. The relevant chambers are then completely dynamically decoupled, whereas the opening check valve enables a re-feeding when the pressure in the gas working chamber drops. Thus, the static behavior corresponds to a large-volume system.

In particularly advantageous exemplary embodiments, the gas storage chamber is provided in the accumulator housing. In this case, the arrangement may be such, that in a particularly advantageous manner, the accumulator housing extends along a longitudinal axis. A separating wall extending in a direction transverse to the axis subdivides the accumulator housing into the gas storage chamber adjoining an axial end of the housing and the gas working chamber. The separating wall includes a passage to form a connecting path. In this way, the pressure accumulator according to the invention can be implemented using an accumulator housing of conventional design which, in deviation from the conventional design, includes merely the inner separating wall having the connecting path. The accumulator housing may be designed on a correspondingly large scale for a sufficiently large make-up volume of gas, whereas the interior chamber may be divided by the arrangement of the separating wall in such a way that a small-volume gas working chamber may be formed in a desired manner despite the large make-up volume.

For a structurally simple configuration of the dynamic decoupling of the gas working chamber from the gas storage chamber, the passage through the separating wall may have the form of a narrow bore forming the restriction of the connecting path. A check valve, if it is provided for the decoupling, is advantageously situated in the passage through the separating wall.

The check valve may be advantageously pre-stressed with a predefined closing force into the closed position. By adjusting the closing force, which is generated preferably by a closing spring, it is possible to predefine the pressure difference, starting the gas make-up from the storage chamber.

The invention can be applied to any accumulator design. For applications as pulsation dampers, the pressure accumulator according to the invention is advantageously designed as a piston accumulator having a piston axially movable in the housing and forming the separating wall, or as a diaphragm accumulator, which includes a separating element in the form of a diaphragm made at least partly of elastomeric material.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2 is a schematically simplified, side view in section of a pressure accumulator according to a second exemplary embodiment of the invention;

FIG. 3 is a partial top view identified with III-III in FIG. 2 of the pressure accumulator of FIG. 2.

DETAILED DESCRIPTION OF THE INVENTION

Figure 1:
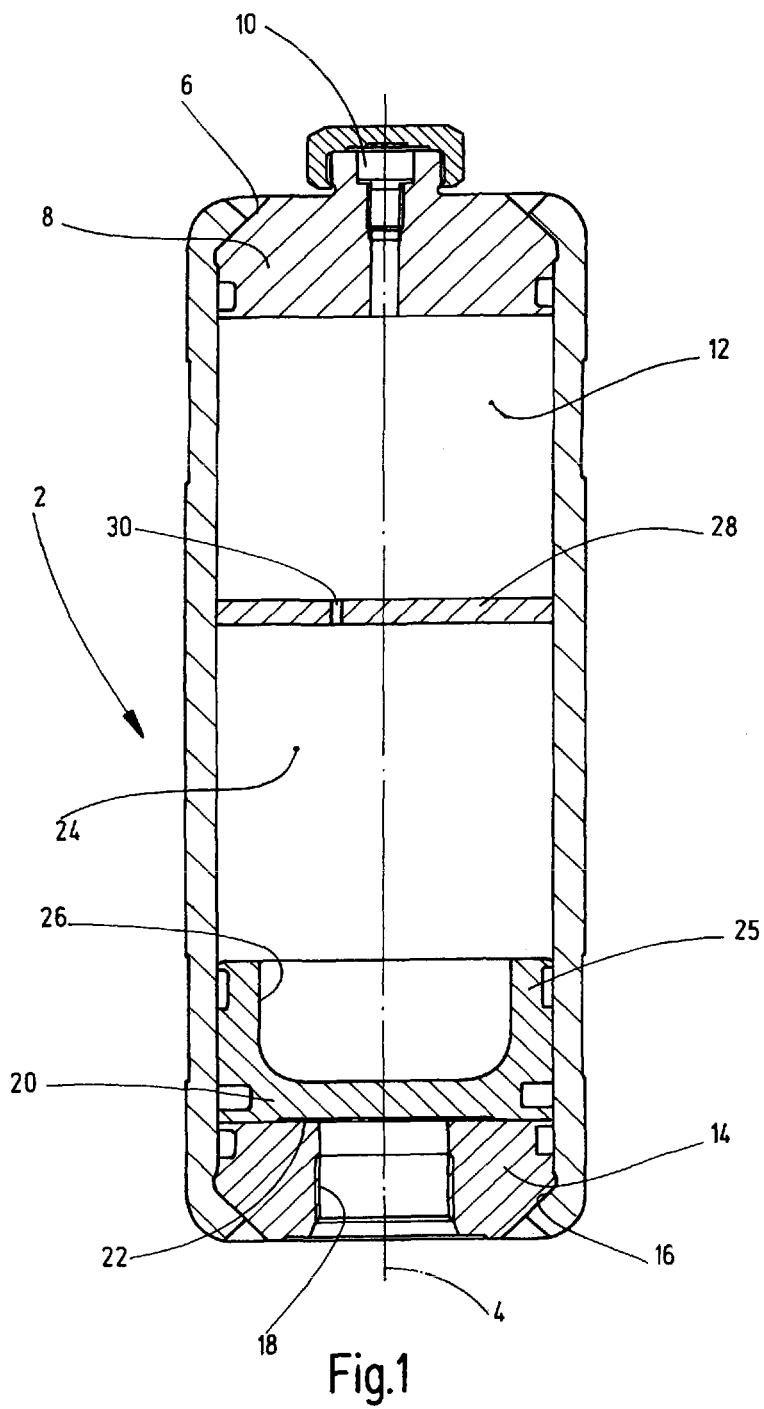
FIG. 1 is a schematically simplified, side view in section of a hydropneumatic pressure accumulator according to a first exemplary embodiment of the invention.

FIG. 1 shows one exemplary embodiment of the pressure accumulator according to the invention having the form of a piston accumulator. The piston accumulator includes an accumulator housing 2 having a circular cylindrical interior chamber extending along a longitudinal axis 4. In FIG. 1, the tube-shaped accumulator housing 2 is connected by an end insert 8 at the upper end, fixed by a bevel 6. The bevel 6 includes a concentrically disposed, conventionally designed gas filling connection 10, via which a gas storage chamber 12 adjacent to the insert 8 can be filled with a working gas, such as nitrogen gas $N_2$, to apply precharge pressure. The accumulator housing 2 is closed at the opposite lower end by an end insert 14, which is also fixed by a bevel 16, and has a central opening 18 for a fluid connection (not depicted). As a piston accumulator, the exemplary embodiment shown has an accumulator piston 20, which moves freely in accumulator housing 2 and forms the separating wall between a fluid chamber 22 connected to the opening 18 and the gas working chamber 24 adjacent to the top of the accumulator piston 20. To minimize the inert mass of the accumulator piston 20 when used as a pulsation damper, but to enable it to be properly guided on the cylindrical inner wall of the accumulator housing 2, the accumulator piston 20 has a trough-like hollow cavity 26 inside an axially extending piston skirt 25. In the operating state depicted in FIG. 1, the fluid chamber 22 is unpressurized, so that the accumulator piston 20 moves to its lower limit of travel.

A separating wall 28 is located between the gas working chamber 24 and the gas storage chamber 12, which separating wall extends perpendicular to axis 4 across the entire inner diameter and is fixed to the inner wall of the accumulator housing 2, for example, by a weld (not depicted). Only a single passage 30 is provided in the separating wall 28 as a connecting path between the gas storage chamber 12 and the gas working chamber 24. This passage has a sufficiently fine bore diameter in the exemplary embodiment of FIG. 1, such that the passage 30 at the same time forms a restriction. When the filling connection 10 is used to fill the working gas into the pressure accumulator for its start-up operation, the precharge pressure continues through the passage 30 into the gas working chamber 24 resulting in equal pressure in both chambers 12 and 24. When operated as a pulsation damper, the working movements of the accumulator piston 20 result in correspondingly rapid pressure changes in the gas working chamber 24, which cause no noticeable volume displacements due to the restriction formed in the passage, i.e. the volume of the gas working chamber 24 is decisive for the dynamic operating behavior. As gas is re-fed from the make-up volume in the gas storage chamber 12 through the passage 10 when gas losses occur during operation. The stationary long-term operating behavior nevertheless corresponds to that of an accumulator having a large volume of gas.

The second exemplary embodiment of FIG. 2 differs from the first exemplary embodiment in that a check valve 32 instead of a restriction is allocated to the single passage 30. The check valve, as indicated by FIG. 2 and the partial view of FIG. 3, includes a closing body 36 pre-stressed by a closing spring 34 into the closed position. Closing body 36 is guided for axial movements in the passage 30 by a star-shaped guide body 38, as indicated most clearly by FIG. 3. The functionality of the exemplary embodiment of FIGS. 2 and 3 differs from the previously described example merely in that the gas working chamber 24 is dynamically completely decoupled from the gas storage chamber 12 by the closed check valve 32, as long as the gas working chamber 24 has a pressure level higher than that of the gas storage chamber 12. The re-feeding of make-up gas from the gas storage chamber 12 occurs only when a higher pressure is present in the gas storage chamber 12. The pressure difference crucial for the opening of the check valve 32 can be predefined by adjusting the closing force generated by the spring 34.

Figure 4:
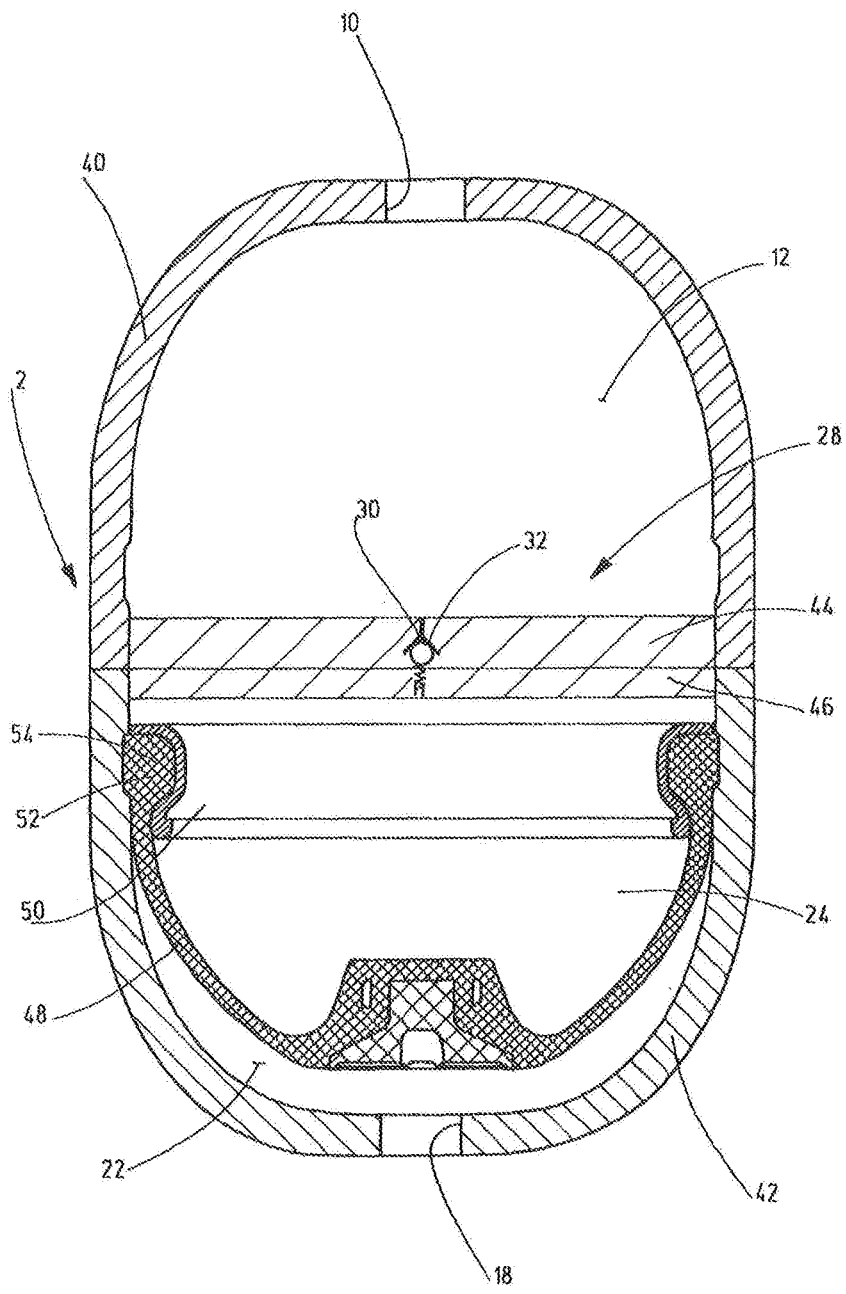
FIG. 4 is a schematically simplified, side view in section of a pressure accumulator according to a third exemplary embodiment of the invention.

FIG. 4 shows a third exemplary embodiment in the form of a pulsation damper formed by a diaphragm accumulator. As in the example of FIGS. 2 and 3, a check valve 32 is provided in the connecting path between the gas storage chamber 12 and the gas working chamber 24 (i.e., in the single passage 30). Check valve 32 is spring-loaded, as in the previously described example. The separating wall 28 is designed in two parts in order to allow the installation of the integrated check valve 32 into the separating wall 28. The accumulator housing 2 in this exemplary embodiment is composed of two single-piece spherical shells 40 and 42 each. One sub-plate 44 of the separating wall 28 is fixed to the upper shell 40. The second sub-plate 46 of the separating wall 28 is fixed to the lower shell 42. An accumulator diaphragm 48 is fixed to the inner wall of the lower shell 42 near the lower sub-plate 46 by a retaining ring 50. The elastomeric material of the diaphragm 48, as is usual with such diaphragms, has a thickened bulge rim 52, which is held in a circular groove-like mounting 54 of the retaining ring 50.

The functionality of the exemplary embodiment of FIG. 4 corresponds to that of the example of FIGS. 2 and 3. The invention is also adaptable to other accumulator designs such as, for example, bladder accumulators. The proportions of the gas storage chamber 12 and the gas working chamber 24 shown in the figures are not decisive and may be selected for desired volume sizes according to the desired operating behavior.

While various embodiments have been chosen to illustrate the invention, it will be understood by those skilled in the art that various changes and modifications can be made therein without departing from the scope of the invention as defined in the claims.

The invention claimed is:

1. A hydropneumatic pressure accumulator, comprising:
    an accumulator housing having a gas working chamber containing pressurized working gas, a fluid chamber and a gas storage chamber containing a make-up volume of pressurized working gas in said accumulator housing, said accumulator housing extending along a longitudinal axis with said working gas chamber being located between said fluid chamber and said gas storage chamber along said longitudinal axis;
    a movable separating element in said accumulator housing separating said gas working chamber from said fluid chamber;
    a separating wall being fixed on an inner wall of said accumulator housing, extending transverse to said longitudinal axis, and subdividing said accumulator housing into said gas working chamber and said gas storage chamber, said separating wall having only a single passage in said separating wall connecting said gas storage chamber and said gas working chamber in fluid communication; and a check valve at said single passage opening fluid communication through said single passage in a direction from said gas storage chamber to said gas working chamber only when gas pressure in said gas storage chamber exceeds gas pressure in said gas working chamber, closing fluid communication through said single passage in a direction from said gas working chamber to said gas storage chamber when gas pressure in said gas storage chamber does not exceed gas pressure in said gas working chamber and remaining fluid communication closed through said single passage from said gas storage chamber to said gas working chamber when gas pressure in said gas storage chamber does not exceed gas pressure in said gas working chamber.

2. A hydropneumatic pressure accumulator according to claim 1 wherein said single passage comprises a narrow bore forming a restriction connecting said gas storage chamber and said gas working chamber.

3. A hydropneumatic pressure accumulator according to claim 1 wherein said check valve is biased into a position closing said single passage.

4. A hydropneumatic pressure accumulator according to claim 1 wherein said separating element comprises a piston axially movable in said accumulator housing along said longitudinal axis.

5. A hydropneumatic pressure accumulator according to claim 1 wherein said separating element comprises a diaphragm made at least partially of elastomeric material.

6. A hydropneumatic pressure accumulator according to claim 1 wherein said check valve is in said single passage.

* * * * *